G. A. Stearns.

Lightning Arrester.

No. 2,043. Reissued Aug. 1, 1865.

Witnesses:
John L. Burke
H. King

Inventor:
George A. Stearns
by Robbins & Burr
his attorneys

UNITED STATES PATENT OFFICE.

GEORGE A. STEARNS, OF ROCHESTER, NEW YORK.

IMPROVEMENT IN LIGHTNING-ARRESTERS FOR TELEGRAPHS.

Specification forming part of Letters Patent No. 43,265, dated June 21, 1864; Reissue No. 2,013, dated August 1, 1865.

*To all whom it may concern:*

Be it known that I, GEORGE A. STEARNS, of Rochester, in the county of Monroe and State of New York, have invented a new and Improved Paratonnerre or Lightning-Arrester, for the protection of telegraphic lines and instruments from injury and derangement by atmospheric electricity; and I do hereby declare that the following is a full, clear, and exact description thereof, reference being had to the accompanying drawings, forming a part of this specification.

It is well known that the operation of telegraph-lines is frequently impeded and even wholly prevented by reason of the wires becoming surcharged with atmospheric electricity in addition to the current of voltaic electricity by means of which the signals are transmitted, and that serious damage to the telegraphic apparatus, and even to the operators themselves, frequently results from this cause, as well as great inconvenience to the public.

To obviate these evils and to discharge from the wires all electricity which has a tendency to interfere with the proper action of the regular voltaic current from the batteries, I have perfected this my invention, which consists, first, in the use of a small wire in the line or main circuit of the telegraph-line, so fine as to prevent the passage of any appreciable quantity of atmospheric electricity, and the combination, with this fine wire, of an extended metallic surface connected with the earth and placed closely adjacent to though not in contact with the line; second, in interposing between the line or main circuit and the extended metallic surface, which, connected with the ground, is designed to catch and carry off all atmospheric electricity, some substance—such as charcoal, powdered sulphur, powdered glass, amber, or other equivalent material—which is a good conductor of atmospheric electricity, but practically a non-conductor of the voltaic electricity necessary for working the line; third, in providing an extended metallic surface in the main or line circuit just in advance of the fine wire placed therein, so as to facilitate the departure from the line of any atmospheric electricity arrested by said fine wire. I have combined these three points of my invention in an apparatus illustrated in the accompanying drawings, in which—

Figure 1:
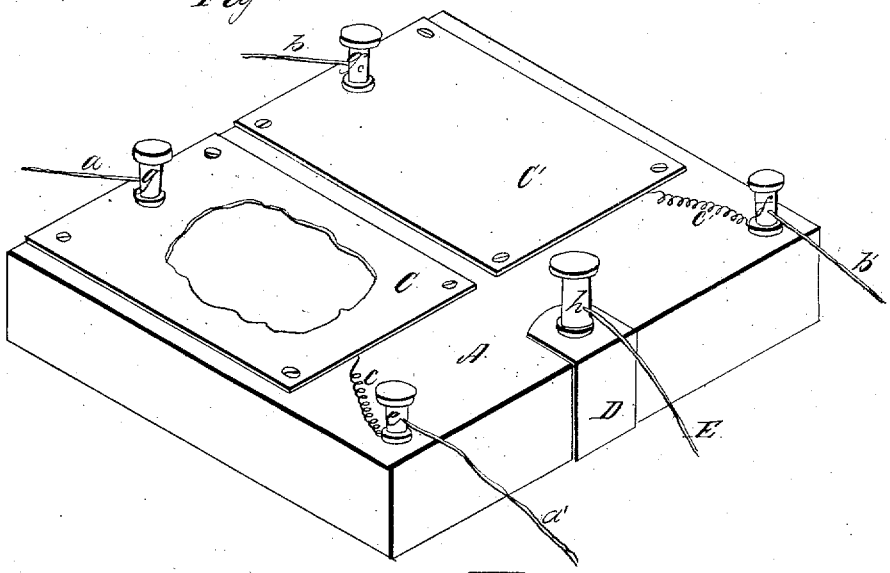
Figure 2:
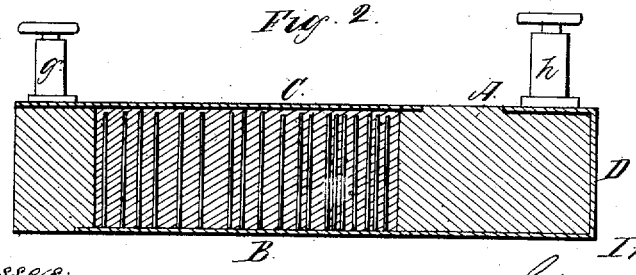

Figure 1 is a perspective view of my improved lightning-arrester; Fig. 2, a section of the same in the line *x x*, and Fig. 3 a section in the line *y y*, of Fig. 1.

Similar letters indicate like parts in all of the figures.

Figure 3:
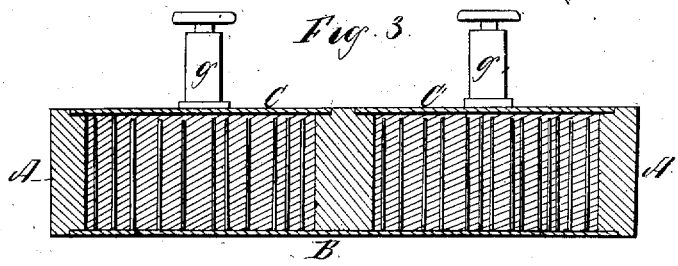

The instrument or apparatus consists of a block or base-piece, A, of wood, gutta-percha, or other suitable non-conducting substance, having one or more openings cut through it from face to face, as seen in Fig. 3.

The lower side of the block A is covered by a single metallic plate, B, which extends over all the apertures in the block and forms the detracting-plate of the instrument. This detracting-plate B (which I prefer to make of copper) is connected with the earth by a large ground-wire, E, attached to any part thereof, so as to make a perfectly free and unimpeded path for the escape and discharge of atmospheric electricity to the earth. For convenience, the ground-wire E is connected with the detracting-plate B in my present model by means of a screw-cup or post, *h*, placed upon a tongue, D, projecting from the plate B, and bent over and upon the block A sufficiently to overlap its upper edge and allow the binding-post or screw cup to project from the upper side of said block, as seen in Fig. 1, though many other arrangements to accomplish the same purpose will readily suggest themselves.

The openings in the block A, closed below by the detracting-plate B, are filled with charcoal, either powdered or in solid piece, or with powdered sulphur, glass, or amber, &c., (or other equivalent substance which is a better conductor of atmospheric than of voltaic electricity,) and then covered by metallic plates C C′, large enough to cover the openings, but which are not allowed to touch each other. Each of these diffusing-plates C C′ is fitted at one end with a suitable screw-cup, *g*, to receive the main wire of the telegraph-line, which, being held thereby, is thus connected with the plate, and terminates at the other end with or in a fine guard-wire, *c*, small enough to resist the passage of more than the ordinary quantity of electrical fluid on the line, but yet sufficiently large not to interfere materially with the ordinary charge of electricity required in the working of the line. This guard-wire *c* is attached to or connected with a second screw-cup, *e* or *f*, in which the wire *a'*, leading to the instrument, is secured. Thus the diffusing-plates C or C' and small guard-wires *c* or *c'* become part of the main or line circuit of the telegraph-line and transmit directly the ordinary voltaic current from the main line to the instruments, while any amount of atmospheric electricity sufficient to disturb materially the action of the telegraphic instruments is arrested at the plate C by the incapacity of the fine guard-wire *c* to conduct it, and conducted by the charcoal or other material in contact with the diffusing-plate C down to the detracting-plate B, whence it escapes freely to the earth by the large wire E or other suitable ground-connection.

In order to render my paratonnerre more delicate and sensitive in its operation, I insert metallic wires or pins in the charcoal or other material placed between the diffusing-plates C C' and detracting-plate B, so placing each wire or pin as that it shall be in contact with one of the plates and very nearly in contact with that opposite thereto, as represented in Figs. 2 and 3 of the drawings, the pins being so short, however, as that even when displaced they cannot touch both upper and lower plates at once.

Although I prefer to unite in my apparatus the advantages obtainable from the proximity of an extended metallic surface (or of a series of metallic points, or both together) to the main or line circuit in connection with a very fine guard-wire therein, and from the use of charcoal or other good conductor for atmospheric electricity in combination with the same, as hereinbefore fully described, still I contemplate omitting the charcoal or its equivalent and so constructing my apparatus as to have simply a metallic surface (or metallic points, or the two in combination) connected with the ground, brought in any suitable manner into close proximity with the main line near the small guard-wire therein, so that the atmospheric electricity arrested by this fine wire, and thereby prevented from reaching or affecting the instruments, may be drawn off and carried away without fusing or injuring said guard-wire.

The addition of the charcoal or its equivalent in the construction of the apparatus is only made to supply an unbroken conductor between the diffusing and detracting plates, and, as has just been stated, although most useful, is not indispensable; but, on the other hand, where charcoal or its equivalent is used, a fine guard-wire is not absolutely required, and may be omitted. I contemplate substituting for the metallic diffusing-plates C and C', placed in the main or line circuit immediately between the main line *a* and the small guard-wire *c*, a metallic coil of insulated or other wire, or other form of extended metallic surface, my object being to obtain such an extended surface at this point (in proximity to the detracting or ground-connected surface) as will facilitate the jumping of the superfluous electricity to the detracting-surface, and its consequent discharge to the earth by the ground-wire. In fact, it is evident that the form and arrangement of the detracting and diffusing surfaces, placed in combination with a fine guard wire in the main circuit, may be widely varied without departing from the spirit of my invention.

I am aware that the mere use of a fine wire in the main circuit of a telegraph-line is not in itself new; but in all arrangements thereof heretofore devised the simple destruction of this wire by fusion under a severe shock of electricity has been solely relied upon as a means of protecting the instruments, no provision being made for the escape of the superfluous electricity entering the office at the moment, and which is liable to do serious damage.

In my apparatus the guard-wire is protected from injury instead of being destroyed, and I claim that the combination of this fine wire with other devices, substantially as herein described, for the purpose of conveying to the ground all atmospheric electricity which is arrested thereby, is a new invention, which will effectually protect telegraph-instruments from the effects of violent lightning-storms, relieve the line from any and all atmospheric electricity at all times, and obviate those changes of adjustment due to its effects.

The guard-wires *c c'* may be made of any desired length, a limit to their size or diameter being alone essential. I prefer a guard-wire of iron (or platina) rather than copper or other material, as the conducting capacity of the former is nearly four-fifths less than of the latter, and the fusing degree one-half higher.

Having thus fully described my invention, what I claim therein as new, and desire to secure by Letters Patent, is—

1. The protection of electric telegraph-lines from the disturbing influences of atmospheric electricity by means of a small fine guard-wire inserted in the main or line circuit thereof in such a manner as to complete said circuit, when such guard-wire is used in combination with a metallic surface (or with a series of metallic points) connected with the earth, and placed in close proximity to the line at or in advance of said guard-wire, all substantially in the manner herein set forth.

2. Establishing communication between the main or line circuit of an electric telegraph and the earth for the discharge of atmospheric electricity from the line by the use of charcoal, powdered glass, powdered amber, sulphur, or other equivalent substances, brought into contact with said line and connected with the ground, substantially in the manner herein set forth.

The foregoing specification of my improvement in lightning-arresters for telegraphs signed by me this 24th day of June, 1865.

GEO. A. STEARNS.

Witnesses:
NEWELL TRAFTON,
L. H. MITCHELL.